United States Patent
Ozbaysal

(10) Patent No.: US 7,293,688 B2
(45) Date of Patent: Nov. 13, 2007

(54) GOLD/NICKEL/COPPER/ALUMINUM/SILVER BRAZING ALLOYS FOR BRAZING WC-CO TO TITANIUM ALLOYS

(75) Inventor: Kazim Ozbaysal, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/272,981

(22) Filed: Nov. 14, 2005

(65) Prior Publication Data

US 2007/0108253 A1   May 17, 2007

(51) Int. Cl.
B23K 35/14   (2006.01)

(52) U.S. Cl. ............................. 228/56.3; 228/245

(58) Field of Classification Search .................. 148/23, 148/24; 420/502, 503, 505, 469, 485, 486, 420/497
See application file for complete search history.

(56) References Cited

U.S. PATENT DOCUMENTS

| | | | |
|---|---|---|---|
| 4,029,479 A | 6/1977 | Parker | |
| 4,040,822 A | 8/1977 | Stern | |
| 4,252,562 A | 2/1981 | D'Silva | |
| 4,447,391 A | 5/1984 | Mizuhara | |
| 4,448,605 A | 5/1984 | Mizuhara | |
| 4,486,386 A | 12/1984 | Mizuhara | |
| 4,604,328 A | 8/1986 | Mizuhara | |
| 4,604,636 A | 8/1986 | Dalal | |
| 4,606,978 A | 8/1986 | Mizuhara | |
| 4,606,982 A | 8/1986 | Nelson et al. | |
| 4,690,876 A | 9/1987 | Mizuhara | |
| 4,903,890 A * | 2/1990 | Mizuhara | 228/262.31 |
| 4,938,922 A | 7/1990 | Mizuhara | |
| 5,033,666 A * | 7/1991 | Keusseyan et al. | 228/122.1 |
| 5,368,220 A * | 11/1994 | Mizuhara et al. | 228/124.5 |
| 2002/0114963 A1* | 8/2002 | Petkie | 428/472 |
| 2004/0060962 A1 | 4/2004 | Jacobson | |
| 2004/0089850 A1 | 5/2004 | Uchida | |
| 2004/0256442 A1* | 12/2004 | Gates et al. | 228/141.1 |

FOREIGN PATENT DOCUMENTS

| | | |
|---|---|---|
| CN | 1323910 | 11/2001 |
| JP | 60166194 | 8/1985 |
| JP | 60216896 | 1/1987 |
| JP | 62207897 | 9/1987 |
| JP | 01249292 | 10/1989 |
| JP | 04305071 | 10/1992 |
| JP | 08310877 | 11/1996 |
| JP | 100996184 | 4/1998 |

OTHER PUBLICATIONS

Web page www.handyharmancanada.com, regarding "Brazing with Gold Filler Metals" (date of first publication unknown). Applicants admit the status of this publication as prior art for the limited purpose of examination of this application, but otherwise reserve the right to challenge the status of this publication as prior art.
Chuang, T.H. et al., "Brazing of Zirconia with AgCuTi and SnAgTi Active Filler Metals," *Metallurgical and Materials Transactions*, 31A, 6, pp. 1591-1597 (Jun. 2000).
Oda, Y. et al., "Effect of corrosion on the strength of soldered titanium and Ti-6Al-4V alloy," *Dental Materials*, pp. 167-172 (May 1996).
Vianco, P. et al., "Aging of Brazed Joints—Interface Reactions in Base Metal/Filler Metal Couples-Part 1: Low-Temperature Ag-Cu-Ti Filler Metal," *Welding Journal*, pp. 201-S-210-S (Oct. 2002).
Vianco, P. et al., Aging of Braze Joints: Interface Reactions in Base Metal/Filler Metal Couples, Part II: High-Temperature Au-Ni-Ti Braze Alloy, *Welding Journal*, pp. 256-S-264-S (Nov. 2002).
European Search Report in EP 6123881.2-1215.

* cited by examiner

*Primary Examiner*—Jonathan Johnson
*Assistant Examiner*—Michael Aboagye
(74) *Attorney, Agent, or Firm*—Marcella R. Louke; William Scott Andes

(57) ABSTRACT

A brazing material including about 2 to about 30 percent by weight gold, about 4 to about 14 percent by weight nickel, about 25 to about 65 percent by weight copper, about 1 to about 3 percent by weight aluminum and about 20 to about 55 percent by weight silver.

25 Claims, No Drawings

GOLD/NICKEL/COPPER/ALUMINUM/SILVER BRAZING ALLOYS FOR BRAZING WC-CO TO TITANIUM ALLOYS

BACKGROUND OF THE INVENTION

The present invention relates to brazing alloys and, more particularly, to brazing alloys for brazing tungsten carbide-cobalt materials to titanium alloys.

Tungsten carbide-cobalt materials(herein WC—Co) often are used to make various parts and components for aircraft engine applications due to the high mechanical strength, hardness, corrosion resistance and wear resistance of WC—Co. For example, wear resistant carboloy pads used in aircraft engines typically are constructed from (90 -98 wt %) WC and (2-10 wt %) Co mixtures. The WC—Co carboloy pads typically are brazed to fan and compressor blade midspan shrouds for wear applications in aircraft engines. These blades typically are made of Ti 6Al-4V and/or Ti 8Al-1V-1Mo alloys with beta transus temperatures at or slightly above 1800° F.

In the prior art, titanium/copper/nickel braze alloys(herein TiCuNi), such as Ti-15Cu-15Ni, have been used to braze carboloy pads to titanium alloy blade midspan shrouds. TiCuNi braze foils have also been used for brazing WC—Co to titanium alloys since TiCuNi is the main braze alloy for brazing of titanium alloys with good strength and ductility. However, TiCuNi alloys have presented various impact failure problems when used in applications involving the brazing of WC—Co to titanium alloys, including chipping and fracturing at the braze joint when the brazed pads are subjected to an impact force (e.g., collision with a bird, an adjacent blade or various debris).

It has been found that the braze impact failures may be attributed to the low ductility brittle braze joints formed when brazing WC—Co to titanium alloys using TiCuNi brazing alloys. In particular, it has been found that tungsten and cobalt from the carboloy pad dissolves into the braze joint when the TiCuNi brazing material is in the molten state, thereby forming a low ductility, high hardness(e.g., about 1200 KHN) W—Co—Ti—Cu—Ni alloy braze interface. The braze interface exhibits cracking at impact energies as low as0.30 joules and the carboloy pad is liberated from the substrate at the brittle braze interface at an impact energy of 0.60 joules.

Thus, TiCuNi braze alloys that have been successfully used for brazing titanium alloys to titanium alloys cannot be used for brazing WC—Co to titanium alloys where impact resistance is required.

Industrially available braze alloys have been unable to meet the combined demands of low braze temperatures(i.e., below 1800° F.), high ductility and low cost necessary for aircraft engine applications. For example, Nioro (Au 82% and Ni 18%) and Nicoro80 (Au 81.5%, Cu 16.5% and Ni 2%) are heavy in gold and light in copper and therefore are expensive and have poor wetting properties and ductility. Alloys incorporating Au 35%, Cu 62% and Ni 3% have liquidus temperatures at or above 1886° F., which is not applicable for brazing WC—Co to titanium alloys. Alloys incorporating silver have also failed to meet the combined demands of low braze temperatures(i.e., below 1800° F.), high ductility and low cost necessary for aircraft engine applications. For example, Cusil™ (63.3Ag-35.1Cu-1.Ti) alloy lacks nickel and may cause wettability problems with WC if braze times are short. Another silver alloy, 95% Ag-5% Al, lacks both copper and nickel and has been unsuccessful in corrosion wear applications of WC—Co on Ti-6Al-4V. A third candidate, a non-silver containing softer braze alloy of high copper content, Copper-ABA®, (Cu+2% Al+3% Si+2.25% Ti) as well as50% Au-50% Ag and 69% Au-25% Ag-6% Pt have braze temperatures at or above the beta transus temperature of Ti-6Al-4V and therefore cannot be used.

Accordingly, there is a need for ductile, impact resistant brazing alloys with brazing temperatures below the beta transus temperature of the substrate titanium alloy. In particular, there is a need for brazing alloys for brazing WC—Co materials to titanium alloys without forming a brittle braze interface.

BRIEF DESCRIPTION OF THE INVENTION

In one aspect, a brazing material is provided, wherein the brazing material includes about 2 to about 30 percent by weight gold, about 4 to about 14 percent by weight nickel, about 25 to about 65 percent by weight copper, about 1 to about 3 percent by weight aluminum and about 20 to about 55 percent by weight silver.

In another aspect, a brazing material is provided, wherein the brazing material includes about 25.3 percent by weight gold, about 5.6 percent by weight nickel, about 46.1 percent by weight copper, about 1.1 percent by weight aluminum and about 21.9 percent by weight silver.

In another aspect, a brazing material is provided, wherein the brazing material includes about 4 percent by weight gold, about 13.3 percent by weight nickel, about 27.6 percent by weight copper, about 2.7 percent by weight aluminum and about 52.4 percent by weight silver.

In another aspect, a brazing material is provided, wherein the brazing material includes about 2.2 percent by weight gold, about 7.3 percent by weight nickel, about 60.3 percent by weight copper, about 1.5 percent by weight aluminum and about 28.7 percent by weight silver.

In another aspect, a brazing material is provided, wherein the brazing material consists essentially of gold, nickel, copper, aluminum and silver, wherein the gold, nickel, copper, aluminum and silver are present in amounts sufficient to provide the brazing material with a brazing temperature of about 1600° F. to about 1750° F. and a braze joint hardness of about 450 to about 550 KHN.

In another aspect, a method for brazing a first substrate to a second substrate is provided. The method includes the steps of positioning a brazing material between the first substrate and the second substrate, wherein the brazing material includes about 2 to about 30 percent by weight gold, about 4 to about 14 percent by weight nickel, about 25 to about 65 percent by weight copper, about 1 to about 3 percent by weight aluminum and about 20 to about 55 percent by weight silver, and raising the temperature of the brazing material to at least about 1600° F.

Other aspects of the present invention will become apparent from the following detailed description and the appended claims.

DETAILED DESCRIPTION OF THE INVENTION

The present invention is directed to Au (2 to 30 wt %), Ni (4 to 14 wt %), Cu (25 to 65 wt %), Al (1 to 3 wt %) and Ag (20 to 55 wt %) alloys for brazing a first substrate to a second substrate (e.g., WC—Co materials to titanium alloys) at brazing temperatures generally below 1800° F., thereby preventing damage to the mechanical properties of the substrates whose beta transus temperatures are at or above 1800° F. In particular, the alloys of the present invention may have a nickel content sufficient to ensure wetting to both WC—Co and titanium substrates, a copper content that is sufficiently high to ensure ductility for impact resistance and a gold and silver content that is reasonably low to ensure adequate cost.

In one aspect, the brazing alloys of the present invention may include about 2 to about 30 percent by weight gold, about 4 to about 14 percent by weight nickel, about 25 to about 65 percent by weight copper, about 1 to about 3 percent by weight aluminum and about 20 to about 55 percent by weight silver.

In another aspect, the brazing alloys of the present invention may include about 25.3 percent by weight gold, about 5.6 percent by weight nickel, about 46.1 percent by weight copper, about 1.1 percent by weight aluminum and about 21.9 percent by weight silver.

In another aspect, the brazing alloys of the present invention may include about 4 percent by weight gold, about 13.3 percent by weight nickel, about 27.6 percent by weight copper, about 2.7 percent by weight aluminum and about 52.4 percent by weight silver.

In another aspect, the brazing alloys of the present invention may include about 2.2 percent by weight gold, about 7.3 percent by weight nickel, about 60.3 percent by weight copper, about 1.5 percent by weight aluminum and about 28.7 percent by weight silver.

In another aspect, the weight percentages of gold, nickel, copper, aluminum and silver in the brazing alloys of the present invention may be selected based upon the intended use of the brazing alloy. In particular, the weight percentages may be selected such that the resulting brazing alloy has high impact resistance and ductility (i.e., low hardness) after brazing and melts below the beta transus temperature of the substrate being brazed such that the mechanical properties of the substrate are not negatively affected (e.g., by way of phase transformations) by high brazing temperatures.

The brazing alloys of the present invention may be provided in various forms. In one aspect, the brazing alloys may be provided as a homogeneous composition including gold, nickel, copper, aluminum and silver. In another aspect, the brazing alloys may be provided as powders. In another aspect, the brazing alloys may be provided as layered or laminated films or foils.

In the powdered form, the brazing alloys may be provided as mixtures of gold, nickel, copper, aluminum and silver powders and/or powders of alloys of one or more of gold, nickel, copper, aluminum and silver, wherein the metals are present in the appropriate quantities. In one aspect, the powders may not form homogeneous alloys until the powders are heated to the appropriate melting/brazing temperature. For example, a brazing alloy according to the present invention may be provided as a dispersion of copper powder, gold/copper/nickel powder and silver/aluminum powder.

In the layered form, gold, nickel, copper, aluminum, silver and alloys thereof may be provided in separate layers, thereby providing homogeneous alloys only after heating to the appropriate melting/brazing temperature. For example, a brazing alloy according to the present invention may be provided as a laminated film or a layered material, wherein a layer of copper is positioned between layers of gold/copper/nickel foil and silver/aluminum foil.

At this point, those skilled in the art will appreciate that various combinations of metals and alloys and various numbers of layers are within the scope of the present invention. Furthermore, those skilled in the art will appreciate that the layered material according to the present invention may be used in its flat (i.e., planar) configuration or may be rolled up or folded prior to brazing.

EXAMPLE 1

A brazing material is prepared using copper foil sandwiched between a layer of gold/copper/nickel foil and a layer of silver/aluminum foil. The thickness of each layer is selected such that the resulting layered material includes about 25.3 wt % gold, about 5.6 wt % nickel, about 46.1 wt % copper, about 1.1 wt % aluminum and about 21.9 wt % silver with respect to the total weight of the layered material. The resulting layered material has a brazing temperature of about 1700° F.

EXAMPLE 2

A brazing material is prepared using copper foil sandwiched between a layer of gold/copper/nickel foil and a layer of silver/aluminum foil. The thickness of each layer is selected such that the resulting layered material includes about 4 wt % gold, about 13.3 wt % nickel, about 27.6 wt % copper, about 2.7 wt % aluminum and about 52.4 wt % silver with respect to the total weight of the layered material. The resulting layered material has a brazing temperature of about 1690° F.

EXAMPLE 3

A brazing material is prepared using copper foil sandwiched between a layer of gold/copper/nickel foil and a layer of silver/aluminum foil. The thickness of each layer is selected such that the resulting layered material includes about 2.2 wt % gold, about 7.3 wt % nickel, about 60.3 wt % copper, about 1.5 wt % aluminum and about 28.7 wt % silver with respect to the total weight of the layered material. The resulting layered material has a brazing temperature of about 1690° F.

EXAMPLE 4

The layered material of Example 1 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1750° F. by way of induction heating for about 10 minutes under vacuum (about $10^{-4}$ torr). After the assembly is allowed to cool, the braze joint has a hardness of about 470 KHN.

EXAMPLE 5

The layered material of Example 2 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1750° F. by way of induction heating for about 10 minutes under vacuum (about $10^{-4}$ torr). After the assembly is allowed to cool, the braze joint has a hardness of about 500 KHN.

EXAMPLE 6

The layered material of Example 3 is rolled up and positioned between a WC—Co (2-10% cobalt) carboloy pad and a titanium alloy (90 wt % Ti, 6 wt % Al and 4 wt % V) midspan shroud and the assembly is raised to a temperature of about 1750° F. by way of induction heating for about 10 minutes under vacuum (about 10⁻⁴ torr). After the assembly is allowed to cool, the braze joint has a hardness of about 495 KHN.

Accordingly, the gold/nickel/copper/aluminum/silver brazing alloys of the present invention are ductile and impact resistant with respect to titanium/copper/nickel brazing alloys and exhibit excellent wetting when used to join various WC—Co materials to various titanium alloy.

Although the gold/nickel/copper/aluminum/silver brazing alloys of the present invention are described herein with respect to certain aspects, modifications may occur to those skilled in the art upon reading the specification. The present invention includes all such modifications and is limited only by the scope of the claims.

The invention claimed is:

1. A brazing material comprising:
    about 25.3 percent by weight gold,
    about 5.6 percent by weight nickel,
    about 46.1 percent by weight copper,
    about 1.1 percent by weight aluminum and
    about 21.9 percent by weight silver.

2. The brazing material of claim 1, wherein the brazing material is in a form selected from a homogeneous alloy form, a powder form, or a layered form.

3. The brazing material of claim 2 wherein said layered form includes at least one layer of copper, at least one layer of gold/copper/nickel alloy and at least one layer of silver/aluminum alloy.

4. The brazing material of claim 2 wherein said layered form includes at least one layer of gold/copper/nickel alloy.

5. The brazing material of claim 2 wherein said layered form includes at least one layer of silver/aluminum alloy.

6. A brazing material comprising:
    about 4 percent by weight gold,
    about 13.3 percent by weight nickel,
    about 27.6 percent by weight copper,
    about 2.7 percent by weight aluminum and
    about 52.4 percent by weight silver.

7. The brazing material of claim 6, wherein the brazing material is in a form selected from a powder form, a layered form, or a homogenous alloy form.

8. The brazing material of claim 7 wherein said layered form includes at least one layer of copper, at least one of gold/copper/nickel alloy and at least one layer of silver/aluminum alloy.

9. The brazing material of claim 7 wherein said layered form includes at least one layer of gold/copper/nickel alloy.

10. The brazing material of claim 7 wherein said layered form includes at least one layer of silver/aluminum alloy.

11. A brazing material comprising:
    about 2.2 percent by weight gold,
    about 7.3 percent by weight nickel,
    about 60.3 percent by weight copper,
    about 1.5 percent by weight aluminum and
    about 28.7 percent by weight silver.

12. The brazing material of claim 11, wherein the brazing material is in a form selected from a layered form, a powder form, or a homogenous alloy form.

13. The brazing material of claim 12 wherein said layered form includes at least one layer of copper, at least one layer of gold/copper/nickel alloy and at least one layer of silver/aluminum alloy.

14. The brazing material of claim 12 wherein said layered form includes at least one layer of gold/copper/nickel alloy.

15. The brazing material of claim 12 wherein said layered form includes at least one layer of silver/aluminum alloy.

16. A method for brazing a first substrate to a second substrate comprising the steps of:
    positioning a brazing material between said first substrate and said second substrate, wherein said brazing material includes about 2 to about 30 percent by weight gold, about 4 to about 14 percent by weight nickel, about 25 to about 65 percent by weight copper, about 1 to about 3 percent by weight aluminum and about 20 to about 55 percent by weight silver; and
    raising a temperature of said brazing material to at least about 1600° F. for at least about 1 minute,
    wherein said first substrate includes a tungsten/carbide/cobalt material and said second substrate includes titanium or alloys thereof.

17. The method of claim 16 wherein said brazing material is a powder.

18. The method of claim 16 wherein said brazing material is a layered material.

19. The method of claim 16 wherein said raising step is performed under a vacuum.

20. The method of claim 16 wherein said brazing material has a composition selected such that said material has a brazing temperature of about 1600 to about 1750° F. and a post-braze hardness of about 450 to about 550 KHN.

21. The method of claim 16 wherein said tungsten/carbide/cobalt material includes about 2 to about 10 percent cobalt.

22. The method of claim 16 wherein the step of positioning the brazing material includes:
    positioning at least one layer of copper and at least one layer selected from the group consisting of a layer of gold/copper/nickel alloy and a layer of silver/aluminum alloy between said first substrate and said second substrate.

23. The method of claim 16 wherein the step of positioning the brazing material includes positioning a non-homogenous form of said brazing material between said first substrate and said second substrate, and wherein a homogenous form of said brazing material is formed during at least a part of the step of raising the temperature of said brazing material.

24. The method of claim 23 wherein said non-homogenous form of said brazing material includes at least one form selected from the group consisting of a layered material and a dispersion of powders.

25. The method of claim 24 wherein said non-homogenous form includes a layered material, the method further including the step of:
    rolling or folding the layered material prior to the step of positioning the brazing material.

* * * * *